United States Patent
Pyritz et al.

[11] Patent Number: 5,882,136
[45] Date of Patent: Mar. 16, 1999

[54] END CAP SYSTEM FOR SCAFFOLDING PLANKS

[75] Inventors: Mary B. Pyritz, Waukesha; Robert M. Reilly, Pewaukee; Stig Karlsen, Burlington, all of Wis.

[73] Assignee: Safway Steel Products, Inc., Waukesha, Wis.

[21] Appl. No.: 896,577

[22] Filed: Jul. 18, 1997

[51] Int. Cl.$^6$ .................................................. F16B 12/00
[52] U.S. Cl. .......................... 403/24; 403/381; 403/301; 248/243; 182/119; 182/222
[58] Field of Search .................. 403/230, 233, 403/235, 248, 246, 241, 381, 331, 49, 300, 301, 24; 182/119, 222; 248/235, 223.41, 225.11, 690, 243, 220.22, 230.1

[56] References Cited

U.S. PATENT DOCUMENTS

| | | | |
|---|---|---|---|
| 4,586,842 | 5/1986 | Puccinelli | 403/246 |
| 4,825,976 | 5/1989 | Wyse | 182/119 X |
| 5,141,078 | 8/1992 | Wood | 182/222 |
| 5,279,193 | 1/1994 | Huffine | 182/119 |
| 5,762,441 | 6/1998 | Karlsen et al. | 403/381 |

FOREIGN PATENT DOCUMENTS

| | | | |
|---|---|---|---|
| 14155 | 8/1980 | European Pat. Off. | 182/222 |
| 250612 | 1/1988 | European Pat. Off. | 182/222 |
| 33261 | 9/1989 | European Pat. Off. | 182/222 |
| 347476 | 12/1989 | European Pat. Off. | 182/222 |
| 2916236 | 10/1980 | Germany | 182/222 |
| 40 36 026 A1 | 5/1992 | Germany . | |
| 4227759 | 2/1993 | Germany | 182/222 |

*Primary Examiner*—Harry C. Kim
*Attorney, Agent, or Firm*—Whyte Hirschboeck Dudek SC

[57] ABSTRACT

An end cap system for scaffolding planks, especially for hollow core planks formed of fiberglass or other composite materials, is disclosed. The end cap includes an extrusion having a plank-receiving portion on one side and a rib profile on the other side for slidingly receiving scaffolding hooks. A reinforcing member is placed in the hollow core, extending between its walls, and surrounding the fastening device securing the end cap to the plank, to resist deformation of the plank by the compressive force of the fastening device. The end cap permits similar parts to be used for a wide variety of plank widths and allows for replacement of damaged hooks or the exchange of hook configurations, such as between "high" or "low" hooks.

20 Claims, 4 Drawing Sheets

5,882,136

END CAP SYSTEM FOR SCAFFOLDING PLANKS

CROSS-REFERENCE TO RELATED APPLICATIONS

The present application is related to U.S. patent application Ser. No. 08/651,202, filed May 17, 1996, now U.S. Pat. No. 5,762,441, and assigned to the Assignee of the present application.

BACKGROUND OF THE INVENTION

1. Field of the Invention

The present invention relates generally to worker-access systems and to planks used with scaffolding systems. More particularly, the present invention relates to an end cap suitable for use with planks, such as hollow core planks. In its most preferred embodiment, the present invention relates to an extruded channel end cap for covering and protecting the end of a scaffolding plank formed with a hollow core and made of a non-metallic material, such as fiberglass or other composite material, and to an arrangement for securing the end cap to the plank. The channel is designed for replaceably supporting a plurality of hooks.

2. Description of the Prior Art

A wide variety of scaffolding systems, also called worker-access systems, are known to the art. The assignee of the present invention markets such systems in the United States. The major components of its systems include tubular, horizontal plank support members arranged for a particular application and planks which are removably placed on the members to allow workers to stand in desired elevated locations at a construction, renovation or other job site. A large number of planks now employed in the United States are made from steel. They typically have an upper planar surface which may include opened or roughened areas to allow water and wind to pass therethrough and to provide a non-slip surface for worker safety. Such planks typically include depending side walls which are inwardly bent at the bottom. Hooks adapted to be removably placed over horizontal scaffolding support members are typically welded to the ends of these planks.

While such scaffolding planks have met with considerable commercial success and have been used in many thousands of locations, certain problems remain. The most important is the weight of the steel planks and another is the fact that the hooks are permanently welded or otherwise attached to the planks making repair or replacement of the hooks time consuming and expensive.

It is also well-known that "high" or "low" hooks may be employed with such planks, depending on the complexity of the scaffolding system and on whether it may be desired to have the planking arranged, without spacers, in a side-by-side arrangement. In certain systems, the high hooks are used to raise the planking level with respect to the horizontal plank support members so that they are above plank couplers. One such type of connection is shown in U.S. Pat. No. 4,586,842 issued May 6, 1986 and assigned to the assignee of the present invention. The named inventor is Joseph S. Puccinelli, and the patent is entitled "Scaffold Joint For A Scaffold Structure". The horizontal members are illustrated at 18 in the figures and planks may be supported on high hooks so that they pass over the ring connections shown at 22.

It is also known to arrange the hooks to allow the planks to be reversed, from end-to-end without interference. In other words, the opposite ends of an individual plank have the hooks arranged at different locations to facilitate reversibility. It is further known, in existing systems, to employ a hold down finger along with the hooks to prevent wobbling of the plank on the horizontal supports if a worker were to walk along an edge thereof.

Certain technology changes have occurred in recent years, especially in Europe, with regarding to scaffolding planks. One such development is described in German Patent No. DE 40 36 026 A1, a copy of which is provided with this specification, along with a non-official translation thereof. The planking system described in this patent is made from a much thinner gauge steel than that used with earlier systems. The planks are configured with a generally planar upper surface and two hollow cores extending the full length thereof. The plank surface and the cores include various corrugations to increase the strength and stiffness of the plank. Such planks provide strength capabilities similar to those of the previously described planks, at a much lower weight. Accordingly, the planks are easier to carry and to erect.

As illustrated and described hereafter, end caps with lobes are provided in certain European systems for coupling the hollow core planks to a channel shaped support system. The end cap includes a flange adapted to extend along the upper surface of the plank and a bottom flange which fits under the hollow cores. Rivets are used to affix the end cap to the plank. The end cap also includes one or more elongate lobes adapted to be received and held in an elongate channel support. Preferably, the lobe is less than one-half the width of the channel support, so that another plank may be placed in end-to-end relationship with the first plank and be supported by the same channel member.

A variety of other types of planking systems are known in the scaffold art, including planks made from plywood or other kinds of lumber. One known structure includes two steel side members which have slots into which a wood plank is placed. Extruded aluminum ends are permanently attached to the side members. The ends include spaced apart top and bottom plates and an outer edge which extends upwardly and downwardly therefrom. Hooks slide over the outer edge and are welded or otherwise secured thereto. Since the hooks extend outwardly from the outer edge of the channel member, they are located a considerable distance from the plank. During use, stresses are transferred between the side members and the horizontal supports through the hooks.

A more complete description of the prior art is set forth in the description of FIGS. 1–4 in U.S. patent application Ser. No. 08/651,202, filed May 17, 1996, which is cross-referenced above.

Several difficulties remain with current scaffolding. The non-interchangeability of hooks for a variety of different scaffold support systems is one problem, especially for scaffolding erection entities which may maintain large inventories of a variety of components. It is also cumbersome in the manufacture of scaffolding planks to use different support components for each width of plank. It is also important that stresses generated during use of scaffolding planks be distributed appropriately from the plank to the support system. Furthermore, it is important to recognize the difficulties which can be encountered in replacing bent or broken hooks.

The patent application cross-referenced above sets forth an end cap system for metallic scaffolding planks formed with hollow cores, which overcomes a number of the disadvantages of the prior art systems noted above. However, it has been found that the further improvements in the end cap system of the cross referenced patent application would be desirable when the plank, with respect to which the end cap system is used, is made from a non-metallic material, such as fiberglass, or another composite material, and formed with one or more generally hollow cores.

SUMMARY OF THE INVENTION

It is a primary feature of the present invention to provide an end cap system for scaffolding planks made of a non-metallic material, and formed with at least one generally hollow cores, which overcomes a number of the disadvantages of the prior art systems set forth above. The present invention features an end cap system which permits a variety of hook components to be interchangeability secured on the same end cap, and which allows broken or bent hooks to be readily replaced.

The present invention also features an end cap system which may be used with many different plank widths while minimizing the number of components that are required.

The present invention further features an end cap system which evenly distributes stresses along the width of the end cap.

The present invention also features an end cap system which may be used with high or low hooks.

How the features of the present invention are provided will be described in the following detailed description of the preferred embodiment taken in conjunction with the drawings. Generally, however, the features are provided for use with a non-metallic, hollow core planking system generally similar to that described above. The inventive system for connecting such planking systems to the scaffolding support systems includes an elongate, preferably extruded, end cap which has a plank receiving channel on one side thereof and a series of ribs on the other, profiled for receiving and supporting the hooks.

As compared to the end cap set forth in the cross-referenced application, the end cap of this invention is provided with a deeper plank receiving U-shaped channel. The deeper plank receiving channel distributes the supporting forces of the end cap over a greater area of the top and bottom surfaces at each end of the plank. A plurality of aligned holes are provided in the upper and lower legs forming the U-shaped channel to receive fastening devices for securing the end cap to the plank. Each of the pairs of aligned holes in the end cap are located in alignment with a hollow portion of the plank, with a pair of aligned holes in the top and bottom surface of the plank aligned with a pair of align holes in the end cap.

A reinforcement member extending between the top and bottom of the plank is placed in the hollow portion of the plank in alignment with the aligned pairs of holes in the end cap and the top and bottom of the plank. A hole extending through the reinforcement member is aligned with the aligned holes provided in the top and bottom of the plank and in the end cap, for receiving a fastening member such as a rolled tube rivet. As compared to the end cap set forth in the cross-referenced application, the deeper U-shaped channel allows the holes in the plank to be located further from the end of the plank so as to provide greater resistance to tearing of the plank material by forces tending to pull the fastening means toward the end of the plank. In alternate embodiments of the invention, modifications are made to the hole diameters and to the length of the internal reinforcement member to provide several pressure distribution arrangements between the plank, end caps and rivets.

In the preferred embodiment, the rib profile of the extruded end cap includes upper and lower ribs which are parallel to one another and two intermediate ribs which are turned, extending upwardly and downwardly to define a central portion which is generally in the shape of a truncated "V". The hooks have profiles adapted to mate with the end cap profile so that they may slide thereover to appropriate locations, following which they are secured using, for example, set screws. The features may also be obtained using certain modifications to the illustrated embodiment without departing from the spirit and scope of the invention. Such modifications are deemed to fall within the scope of the invention if they fall within the scope of the claims which follow.

DESCRIPTION OF THE DRAWINGS

In the various figures like reference numerals are used to illustrate like components.

DETAILED DESCRIPTION OF THE PREFERRED EMBODIMENT

Before proceeding with the detailed descriptions of the preferred embodiments, several comments can be made with regard to the applicability and the scope of the present invention. First, the planking used with the end cap of the present invention is preferably generally hollow core planking, formed of a non-metallic material, which will be described below by making reference to FIG. 2. However, depending on such features as strength requirements, and width, the scaffolding planking may formed with various hollow core arrangements. The principal advantages of the hollow-core planking are described above. The surface and core configurations for such planking can vary widely, depending on strength requirements and other factors which, in and of themselves, are well-known in the design of high strength hollow core members. Depending upon the shape of the hollow portion of the scaffolding plank through which the end cap fastening means extends, the reinforcement or support member which is shown in the form of a spool in FIG. 3, may be provided in other shapes and with end surfaces formed to mate with the abutting inner surfaces of the top and bottom of the hollow portion of the scaffolding.

Second, the widths and lengths of the plank may be varied as is commonly known with present scaffolding technology.

Figure 1:
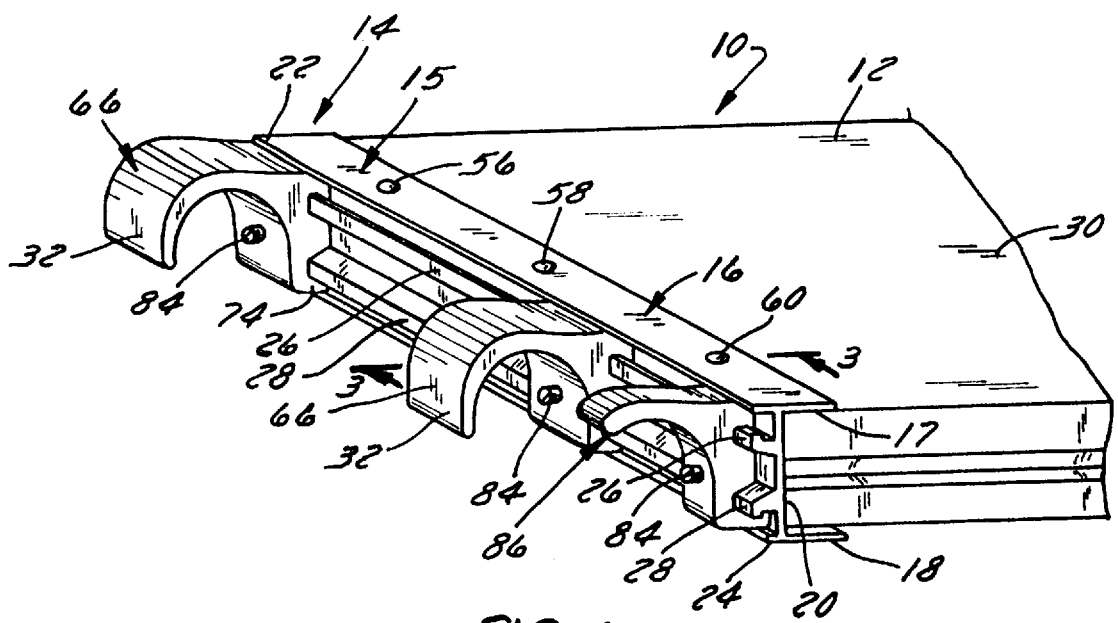
FIG. 1 is a perspective view of a hollow core plank with an end cap attached in accordance with this invention.

Third, three hooks are illustrated in FIG. 1 for use with common scaffold support members. The particular dimensions of the hook openings and the number of hooks to be used with the end cap can be varied from those shown in the illustration.

Figure 4:
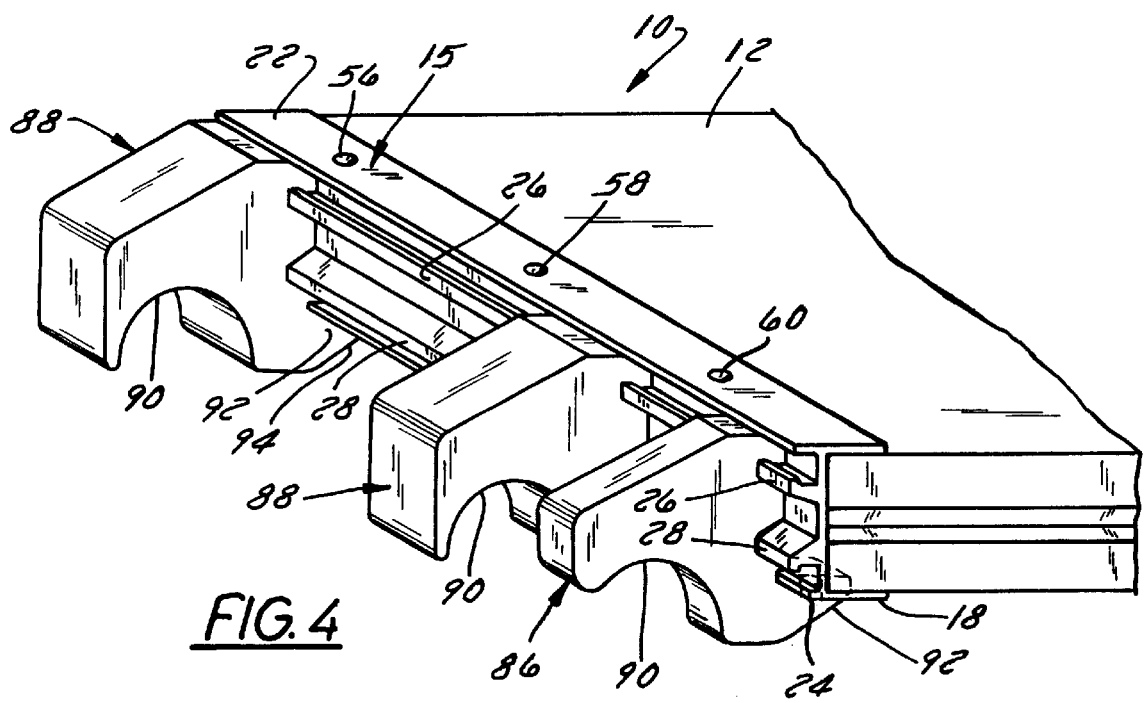
FIG. 4 is a perspective view similar to FIG. 1, showing an alternate embodiment of this invention.

Fourth, fingers such as the ones shown in FIGS. 1 and 4 are commonly employed with planking systems. Such fingers may advantageously be used to avoid wobbling of the plank as described previously in this specification.

Fifth, while one particular technique is shown for securing the hooks in position on the end cap (namely set screws) other securing techniques may be employed, such as nailing, bolting and the like.

Sixth, the particular materials used in the present invention can be varied. While aluminum is the preferred material for the end cap extrusion and hooks, various other materials and alloys can be employed provided the desired strength, weatherability and other requirements are achieved. Similarly, while in the preferred embodiment the hollow core planking is formed of fiberglass by a pultrusion process, other methods and materials for forming the hollow core planking could be employed.

Finally, while the planking may be used with a wide variety of support members, it is particularly well-suited for use with the scaffold structure described and illustrated in the aforementioned U.S. Pat. No. 4,586,842. That patent, and its disclosure, are incorporated herein in their entirety by this reference. That system is particularly useful with high hooks, so that the planks will fit over the circular ring supports.

Figure 2:
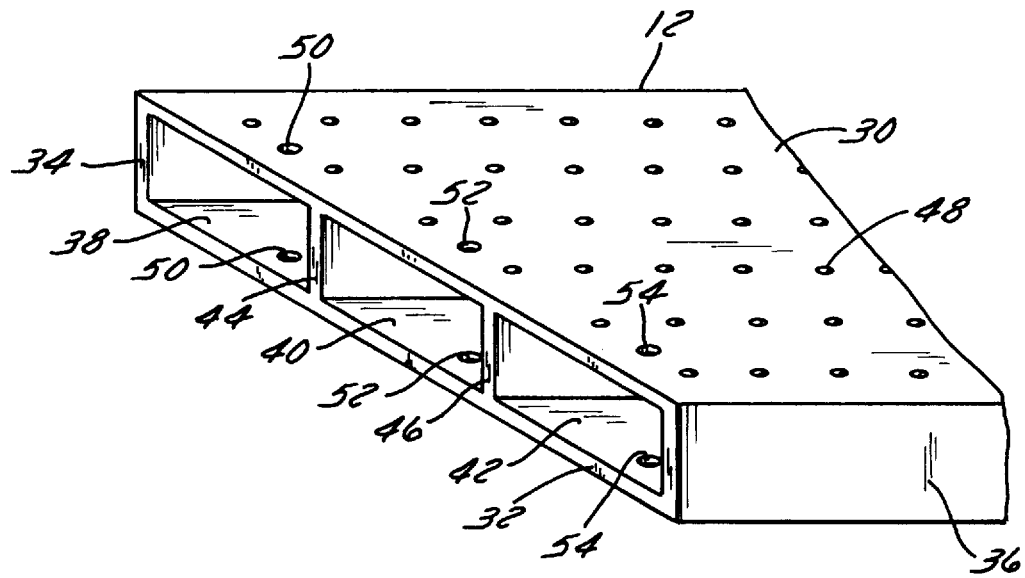
FIG. 2 is a perspective view of an end section of the plank shown in FIG. 1.
Figure 3A:
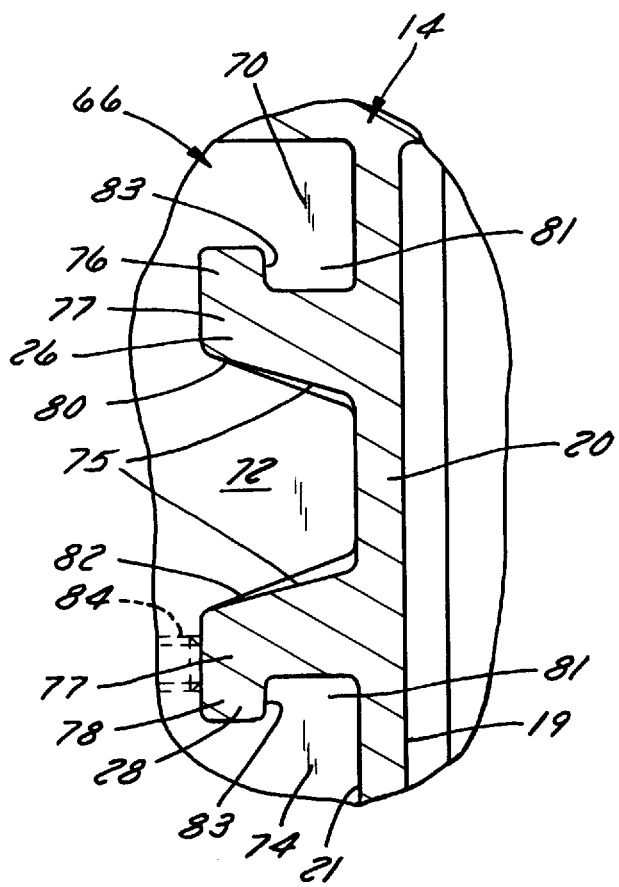
FIG. 3A is a magnified partial sectional generally showing the hook and ribs of FIG. 3.
Figure 3:
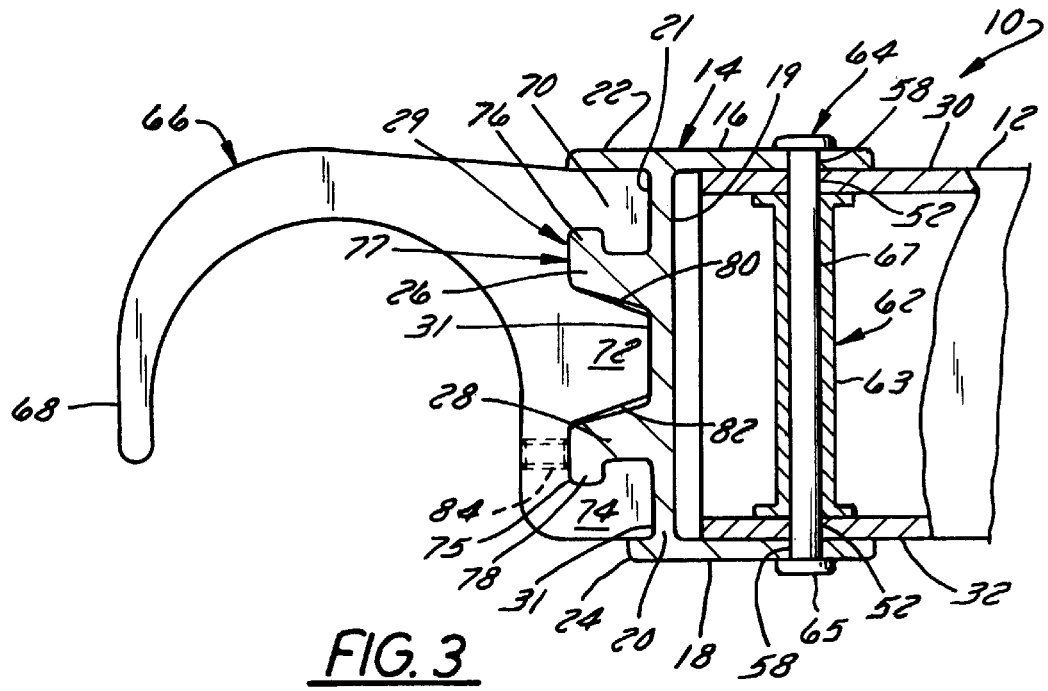
FIG. 3 is a partial sectional view showing the attachment of the end cap to the hollow core plank as taken along the line 3—3 in FIG. 1.

A first embodiment of the present invention is illustrated by FIGS. 1–3. FIG. 1 shows an end cap and plank system 10 including a plank member 12 which may be, in the most preferred embodiment, a hollow core fiberglass plank. An end cap 14 is preferably formed from an elongated extension 15 and is shown in FIGS. 1 and 3 to include a generally U-shaped receiving portion or channel 17 to capture an end of plank 12. The U-shaped channel 17 is formed by generally two legs, an upper leg 16, a lower leg 18 and a base 20 perpendicular to legs 16 and 18. The legs 16, 18 extend outwardly from a first side 19 of the base 20. Extending outwardly from a second side 21 of the base 20, opposite the legs 16 and 18 are extensions 22 and 24. These extensions 22 and 24 may form a pair of spaced art plates. Also extending outwardly from the second side 21 of the base 20 in the same direction as the extensions 22 and 24 are a pair of ribs 26 and 28 which will be described in detail later herein. The extensions 22, 24 and ribs 26, 28 form a hook supporting portion 29 which may be divided into at least three hook receiving areas 31 adjacent the base 20.

The end cap system of this invention is intended for use on a hollow fiberglass plank 12 such as in shown in FIG. 2 formed, for example, by a pultrusion process. The plank 12 has a top wall 30, a bottom wall 32 and side walls 34 and 36. The hollow core is divided into three elongated rectangular tubes 38, 40 and 42 by internal vertical walls 44 and 46. While two internal vertical walls are shown, depending on the width of the plank and other considerations, a different number could be employed. The upper surface of the plank is formed with a rippled surface 48 which is designed to offer increased friction, that is reduce slipperiness to users.

In accordance with this invention, pairs of aligned holes 50, 52, and 54 are provided in the top 30 and bottom 32 of the plank, which extend into the three rectangular tubes 38, 40, and 42 respectively.

Referring to FIGS. 1 and 3, the upper and lower legs 16 and 18 of end cap 14 are provided with holes 56, 58, and 60, which may be aligned with the holes 50, 52 and 54 respectively, in the plank. As shown in FIG. 3, a support member 62, placed in the tube 42, extends between the inside surfaces of the top 30 and bottom 32 of the plank. The support member 62 is provided with a through hole 67 or central bore, through which a fastening device 64 extends, for example, from hole 58 in the leg 16 through aligned hole 52 in the plank out the aligned holes 58, 52 on the bottom wall 32 and leg 18, respectively. As shown in FIG. 3, the support member 62 may be formed as a spool 63 and the fastening device 64 as a rivet 65. The support member 62 is provided to resist the inward deformation of the top 30 and bottom 32 as compressive forces are applied thereto by the fastening device 64. With the support member 64 formed in a spool shape, the enlarged ends provide support to a greater surface area of the top and bottom of the plank. In a preferred embodiment of this invention, the fastening devices 64 are tubular rivets. The tubular rivets provide the desired fastening force, while being of reduced weight, particularly when formed of aluminum, as compared for instance to a bolt and nut. During fastening, pressure generated by the rivet is transferred to the end cap and fiberglass plank 30 as well as being absorbed by the spacer 62. While a single fastening device is shown in the center of each of the three rectangular tubes 38, 40, and 42, two or more could be provided. Should the inner surfaces of the top and bottom of the plank, in the hollow portion through which the fastening means pass, be other than flat as shown in FIGS. 2 and 3, the end surfaces of the support member should be configured to mate with the inner surfaces.

As compared to the end caps disclosed in the cross-referenced application, the upper and lower legs 16 and 18 are longer, so as to form a deeper U-shaped channel to spread the supporting force of the end cap 14 over greater surface areas of the top and bottom surfaces of the plank. In accordance with this invention the deeper channel is also provided such that the holes for the fastening devices can be located farther from the end of the plank, thus providing a longer portion of plank material to resist tearing of the plank material by forces pulling the fastening devices toward the end of the plank.

Scoffolding hooks 66, as shown in FIGS. 1 and 3, are of the "low hook" variety, meaning they are adapted to be used with horizontal scaffold support members which are at the same level as the planks. Hooks 66 include an outer hook end 68 and a profile end comprising elongate protruding portions 70, 72, and 74 which form channels 75 for receiving ribs 26 and 28. Portion 70 is adapted to be slidingly received between extension 22 and rib 26 of the end cap 14. Portion 72 is adapted to fit between ribs 26 and 28, while portion 74 is adapted to be received between rib 28 and extension 24. The particular configuration of these ribs and portions is not extremely critical to the invention, as long as support is provided for the hooks and so long as the hooks may be slidingly moved to an appropriate location along the end cap 14. However, the illustrated profile is preferred, i.e. bends 77, especially upturned outer end 76 of rib 26 and the downwardly turned outer end 78 of rib 28. The bends 77 assist in holding the hook 66. The portion 72, as illustrated, may also add strength properties to the hook and end cap assembly, especially at the two inclined areas shown as 80 and 82 in FIGS. 1, 3 and 4 on the side of the ribs 26, 28. As previously mentioned, a finger 86, secured to the end cap 14 in the same manner as hooks 66 may be used to avoid wobbling of the plank when in use.

As best shown in FIG. 3A, the ribs 26, 28 include inclined areas 80, 82 which may end in bends 77 and may form a generally U-shaped receiving area. The bends 77 of the ribs 26, 28 may be received by openings 83 formed by protrusions 81 of the hook 66 which extend from the protruding portions 70, 74. These protrusions 81 may be formed in the generally U-shaped receiving area of the ribs 26, 28 as shown in FIG. 3A. Referring to FIG. 4, a high hook embodiment of this invention is illustrated. Except for the hook configuration, this embodiment is identical to the embodiment shown in FIGS. 1 and 3. The high hook 88 is used when it is desired to have the planking 12 at a higher level than the horizontal support members. The high hook includes a profile for engagement with the end cap which is identical to that shown in the other figures, although the hook end is shaped differently. Mainly, the semi-circular portion 90 of the hook is arranged at the level of extension 92, and an inner extension 94 is provided on the high hook which lies against leg 18 when the hooks are assembled on the end cap.

A variety of fastening techniques may be employed to secure the hooks 66 and finger 86 to the end cap 14. In FIGS. 1, 3 and 4, a set screw 84 is shown, but as mentioned previously, other fastening techniques such as nailing, bolting or the like may be used.

When the desired width of the plank is determined, the appropriate hooks are slid into position on end cap 14 and are secured thereto by the techniques described above. Should the hooks become damaged, or should they need to be relocated for any reason, the hooks may be moved or replaced at the discretion of the user.

It is also contemplated in the present invention that several segments of end cap 14 may be used along an end of the plank, again without departing from the spirit and scope of the invention.

Two alternate embodiments will now be described in connection with FIGS. 5 and 6. In the first of those, a tubular rivet 108 is employed with a spacer 110 and the arrangement is generally similar to that of the preferred embodiment. However, the holes in the plank 30 and end cap legs 16 and 18 are larger, so that support member 62, or in this case the spacer 110, can extend through both. The rivet 108 then is compressed against the hook assembly end cap 14 with pressure more evenly transferred to the plank 30 and end cap 14 without undesirable plank deformation.

Figure 5:
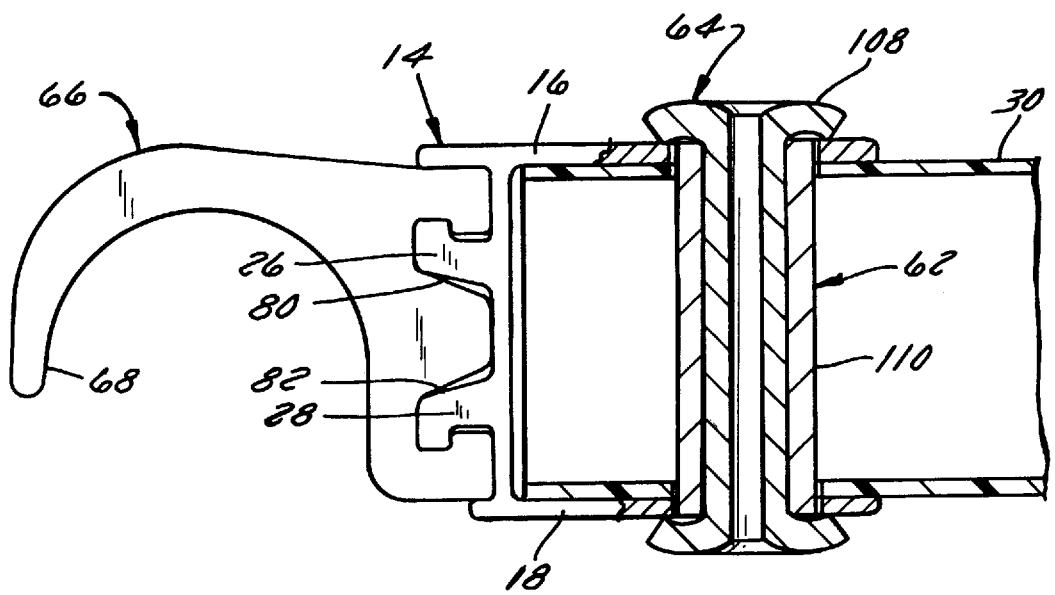
FIG. 5 is a partial sectional view showing an alternate form of the invention in which the spacer extends through the plank and the end cap.
Figure 6:
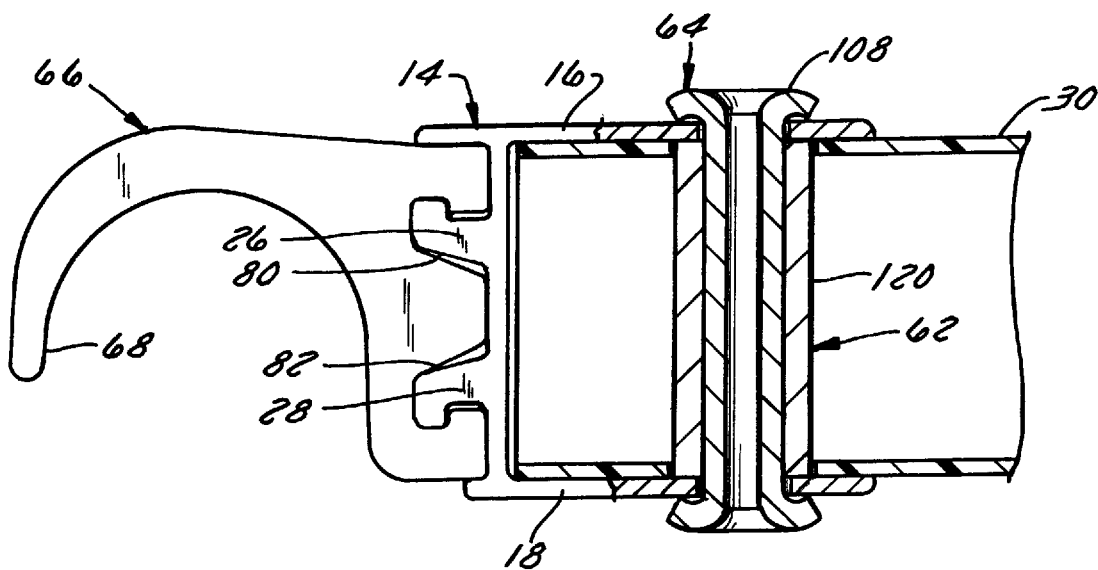
FIG. 6 is a partial sectional view showing another alternate form of the invention in which the spacer extends through the plank but rests entirely between the end cap legs.

The embodiment illustrated in FIG. 6 is similar to that of FIG. 5 except that the holes in the end cap legs 16 and 18 are smaller and the spacer 120 is shorter so that it lies entirely between the end cap legs 16 and 18 while extending through the plank holes. In this embodiment, pressure is transmitted primarily to the end cap 14 and the spacer 120 without deforming the fiberglass plank 30.

So while the present invention has been illustrated and described in connection with preferred embodiments, numerous alternatives will appear to those skilled in the scaffolding art after they have read the specification. These alternatives are deemed to fall within the scope of the present invention if they fall within the scope of the claims which follow.

What is claimed is:

1. A scaffolding end cap and plank system comprising:
   an elongate hollow core plank having first and second ends, top and bottom walls, and vertical side and internal walls forming a plurality of elongated hollow tubes;
   an end cap for each of the first and second ends comprising an elongate extrusion having a generally U-shaped receiving portion formed by two legs extending from a first side of a base, and a hook supporting portion extending from a second side of the base including a plurality of parallel and spaced apart ribs, and a spaced apart extension extending from the base in a direction opposite that of the legs,
   a support member which extends at least between the top and bottom walls of the hollow tube in the plank and formed with a through hole which is aligned with aligned holes in the legs and in the top and bottom walls of the plank;
   a fastening device received in the aligned holes to secure the end cap to the elongate hollow core plank, the support member resisting deformation caused by the compressive force of the fastening device; and
   a plurality of scaffolding hooks removably coupled to the end cap, each of the hooks having channels for slidingly engaging the ribs of the end cap when the hooks are placed over the ends of the end cap.

2. The system of claim 1 wherein at least one of the ribs includes a bend at its outer end to assist in retaining the hooks.

3. The system of claim 6 wherein two ribs are provided and wherein each includes a bend, the bends being directed away from each other.

4. The system of claim 3 wherein each rib includes an inclined area on the side thereof facing the other rib, whereby the inclined area and the base define a hook receiving area which is in the shape of a truncated "V" when viewed in section.

5. The system of claim 4 wherein each hook has a "U" shaped portion adapted to slidingly fit within shaped receiving area.

6. The system of claim 1 wherein each hook has a protruding portion adapted to slidingly fit within a receiving area.

7. The system of claim 1 wherein each hook has an opening along the channel adapted to slidingly engage a bend.

8. The system of claim 1 wherein a set screw is employed to removably couple the hooks to the end cap.

9. A scaffold structure system comprising:
   an elongate plank having first and second ends, top and bottom walls, and side walls forming a hollow tube;
   an end cap for at least one of the first and second ends comprising an elongate extrusion including a base having a first side and a second side opposed to the first side, a pair of legs which extend outwardly from the first side of the base, and at least one rib which extends outwardly in a direction opposite the legs from the second side of the base;
   a support member abutting the top and bottom walls of the hollow tube in the plank;
   a fastening device for securing the end cap to the elongate plank; and
   a plurality of hooks removably coupled to the rib of the end cap.

10. The system of claim 9 wherein the end cap further comprises an extension for forming a hook receiving area.

11. The system of claim 9 wherein the plank is constructed of a non-metallic material and includes a rippled surface for increased friction.

12. The system of claim 9 further comprising fingers for preventing wobbling of the plank.

13. The system of claim 9 wherein the hook is a high hook.

14. The system of claim 9 wherein the hook is a low hook.

15. The system of claim 9 wherein the end cap connects to an outer surface of the plank.

16. The system of claim 9 further comprising a plurality of connected vertical and horizontal tubular members operably associated with the end plank.

17. The system of claim 9 wherein at least one of the ribs includes a turned outer end.

18. The system of claim 9 wherein the plank further includes a plurality of internal vertical walls between the top wall and the bottom wall for added structural support.

19. A scaffolding end cap and plank system comprising:

an elongate plank having first and second ends, top and bottom walls, and side walls forming an elongated hollow tube;

an end cap for each of the first and second ends comprising an elongate extrusion having a generally U-shaped receiving portion formed by two legs extending from a first side of a base, and a hook supporting portion extending from a second side of the base including ribs;

a support member which extends through the top and bottom walls of the plank;

a fastening device to secure the end cap to the elongate plank; and a plurality of scaffolding hooks for removably engaging the ribs of the end cap.

20. The system of claim 19 wherein the support member extends through the end cap legs.

* * * * *

UNITED STATES PATENT AND TRADEMARK OFFICE
CERTIFICATE OF CORRECTION

PATENT NO. : 5,882,136
DATED : March 16, 1999
INVENTOR(S) : Mary B. Pyritz, et. al.

It is certified that error appears in the above-identified patent and that said Letters Patent is hereby corrected as shown below:

Item [56] unfer Foreign Patent Documents
Title page, second column: FOREIGN PATENT DOCUMENTS Reference "33261" should be replaced with --332061--

Column 5, line 39: Replace "art" with --apart--.

Column 8, line 17: Replace "claim 6" with --claim 1--.

Column 8, line 26: Insert after "within", the following: --the "V"--.

Signed and Sealed this

Twenty-fourth Day of August, 1999

Attest:

Q. TODD DICKINSON

*Attesting Officer*     *Acting Commissioner of Patents and Trademarks*